United States Patent [19]

Minagawa et al.

[11] Patent Number: 5,386,502
[45] Date of Patent: Jan. 31, 1995

[54] PAINTING PATTERN GENERATION SYSTEM USING OUTLINE DATA AND FLAG DATA

[75] Inventors: Tsutomu Minagawa, Fujisawa; Naoyuki Kai, Tokyo; Masahide Ohhashi, Yokohama, all of Japan

[73] Assignee: Kabushiki Kaisha Toshiba, Kanagawa, Japan

[21] Appl. No.: 123,849

[22] Filed: Sep. 9, 1993

Related U.S. Application Data

[63] Continuation of Ser. No. 724,939, Jul. 2, 1991, abandoned.

[30] Foreign Application Priority Data

Jul. 3, 1990 [JP] Japan ................... 2-174374

[51] Int. Cl.⁶ ............................. G06F 15/62
[52] U.S. Cl. .................... 395/141; 395/133; 395/143
[58] Field of Search ............. 395/130, 129, 126, 135, 395/141, 134, 133, 121, 143; 358/261.1; 340/709

[56] References Cited

U.S. PATENT DOCUMENTS

| | | | |
|---|---|---|---|
| 4,745,575 | 5/1988 | Hawes | 364/900 |
| 4,970,688 | 11/1990 | Minagawa et al. | 365/189.01 |
| 4,982,343 | 1/1991 | Hourvitz et al. | 395/135 |
| 4,987,551 | 1/1991 | Garrett, Jr. | 364/521 |
| 5,016,001 | 5/1991 | Minagawa et al. | 340/747 |

FOREIGN PATENT DOCUMENTS 53-41017 10/1978 Japan .

OTHER PUBLICATIONS

"Principles of Interactive Computer Graphics", by W. M. Newman and R. F. Sproull, for McGraw-Hill Book Company, 1979.
Ackland, "The Edge Flag Algorithm—A Fill Method for Raster Scan Displays," IEEE Transactions on Computers, vol. C-30, No. 1, Jan. 1981, pp. 41–48.

*Primary Examiner*—Heather R. Herndon
*Assistant Examiner*—Michael S. Smith
*Attorney, Agent, or Firm*—Finnegan, Henderson, Farabow, Garrett & Dunner

[57] ABSTRACT

A painting pattern generation system for painting interior areas enclosed by outlines indicated by outline data and flag data. This includes a first memory for storing outline data, a second memory for storing flag data, and an operational circuit for reading out the outline data. The flag data in the first and the second memories performs a logical exclusive OR operation on adjacent items of the flag data in the second memory in a scan line direction, and performs an OR operation between the result of the logical exclusive OR operation and the outline data in the first memory in all of the scan line directions. Thus obtaining the painted pattern data, and a writing circuit for writing the painted pattern data obtained by the operational circuit to overlap it with subsequent outline data in the first memory.

7 Claims, 7 Drawing Sheets

PATTERN AFTER PAINTING

FIG. 3A

DIRECTION OF SCAN LINE

DRAWING OF OUTLINE

PAINTING PATTERN GENERATION SYSTEM USING OUTLINE DATA AND FLAG DATA

This application is a continuation of application Ser. No. 07/724,939, filed Jul. 2, 1991, now abandoned.

BACKGROUND OF THE INVENTION

1. Field of the Invention

This invention relates to a painting pattern generation system for painting a plurality of regions enclosed by outlines (or boundaries) and a pattern painting method using the system.

2. Description of the Prior Art

A painting method is commonly known by which a plurality of pattern interior areas enclosed only by outlines (or boundaries) are selectively painted based on an even-odd rule.

Figure 1:
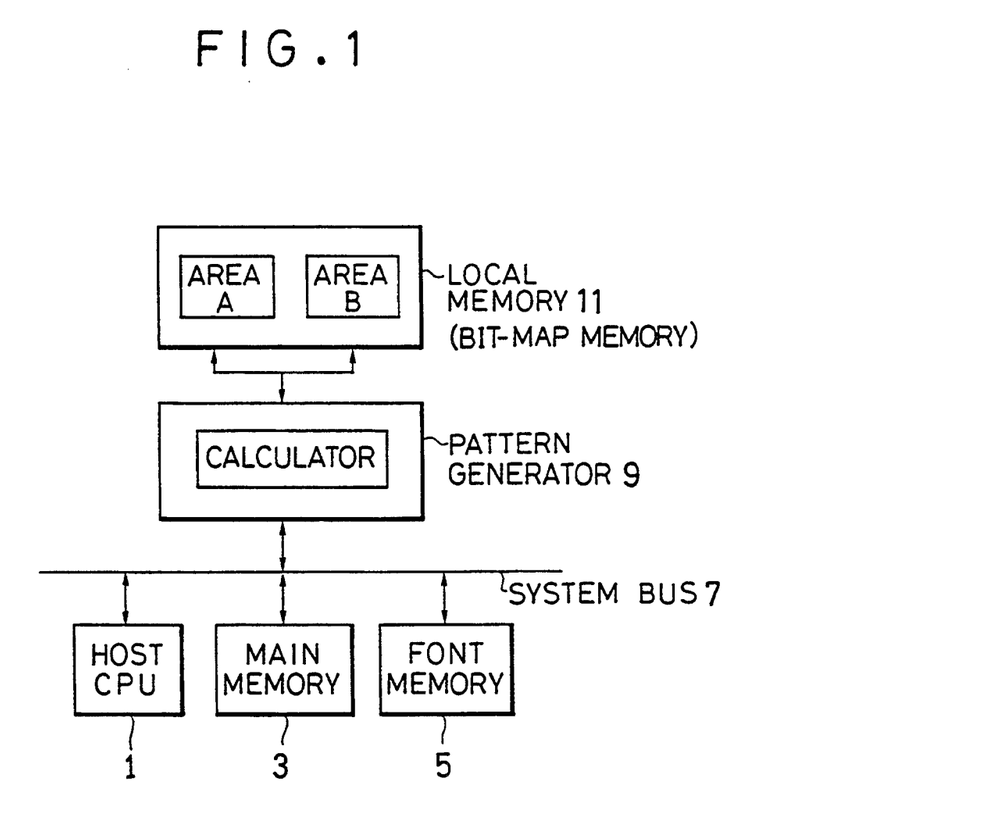
FIG. 1 is a block diagram of a conventional pattern generating system.

FIG. 1 is a block diagram of a painting pattern generation system which uses the even-odd method. The system comprises a local memory (or a bit-map memory) 11 including a first memory area A and a second memory area B, the size of which are matched to the size of a pattern to be generated, a pattern generating device 9 by which the contents of the first and the second memories are read out and then processed by a logical operation to generate a pattern, a central processing unit CPU 1 as a host CPU (or a processor) which can control the operation of the pattern generating device 9, and a main memory 3 and a font memory 5 connected to the host CPU 1.

In the painting pattern generation system, a white and a black pattern are expressed by two data units, "1" and "0".

Next, an example of the conventional pattern painting method based on the even-odd method will be explained with reference to FIGS. 2A to 2C.

Figure 2A:
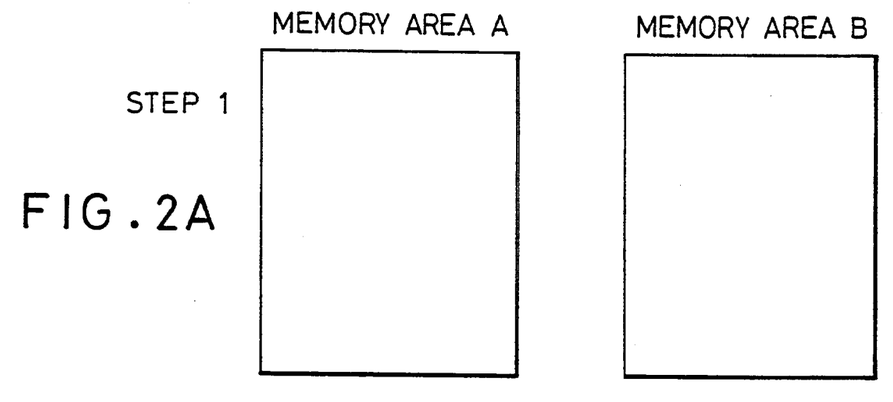
FIGS. 2A to 2C are memory regions to be painted by using the conventional pattern generating system as shown in FIG. 1.

In step 1, shown in FIG. 2A, the contents of the first and the second memories are initialized by the pattern generating device 9 under the control of the host CPU 1.

Figure 2B:
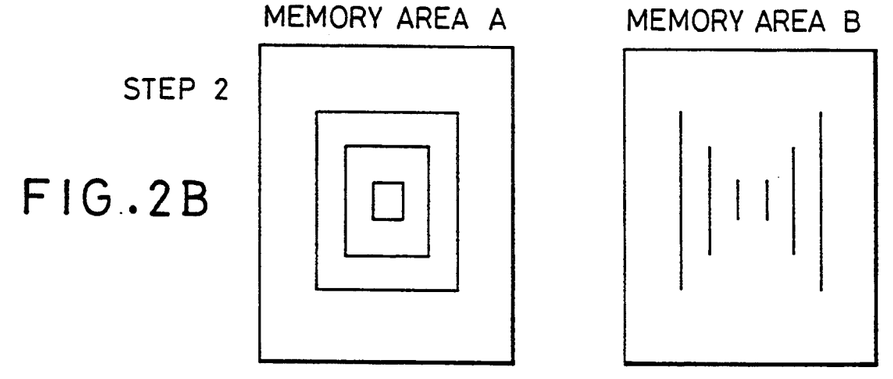

Next, in step 2, shown in FIG. 2B, the pattern generating device 9 draws outline data in the first memory A and provides flag data in the second memory B. The flag data is required for the painting operation and is generated by a predetermined rule.

Figure 2C:
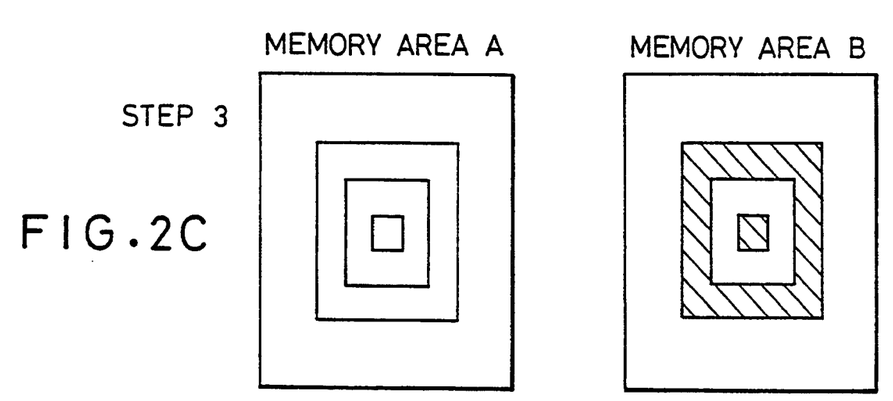

Next, in step 3, shown in FIG. 2C, the pattern generating device 9 reads out the outline data and the flag data in the first and the second memories A and B, then calculates an exclusive OR (XOR) operation between two adjacent items of flag data along a scan line direction, which is a painting operation for the interior of an area enclosed by the outlines. At the same time, a logical OR operation between the result of the XOR operation and the outline data in the first memory A is carried out in the scan line direction. (This OR operation is a compensation operation for the painting operation.)

The result of the OR calculation is written on the same scan line in the second memory B.

Steps 1 to 3 are carried out for all scan lines on the outlines (or the closed curves which are generated by the outline data) involved in the pattern to obtain the completely painted pattern data. The completely painted pattern data is read out to the main memory 3 by the host CPU 1.

In order to execute a next pattern generating operation, the steps 1 to 3 described above are performed repeatedly at the required times.

Figure 3A:
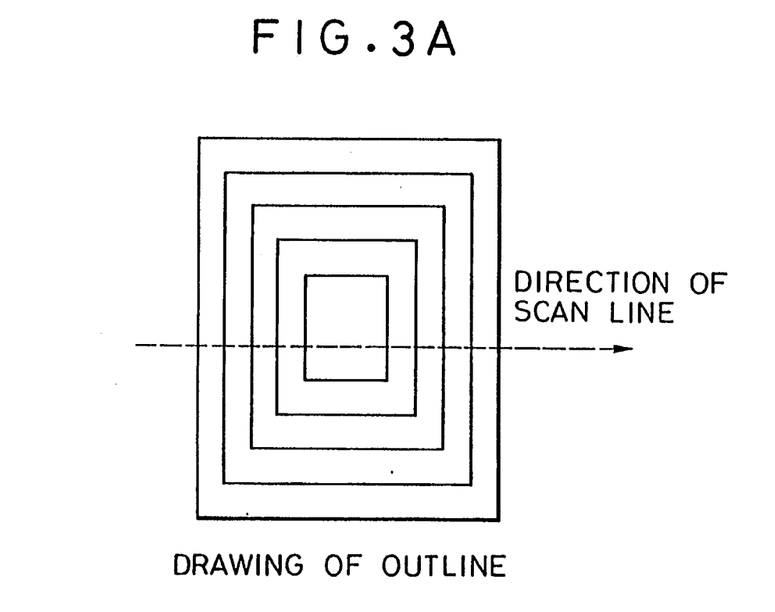
FIGS. 3A and 3B are pattern diagrams showing a painting operation executed along a scan line by the conventional pattern generating system as shown in FIG. 1.
Figure 3B:
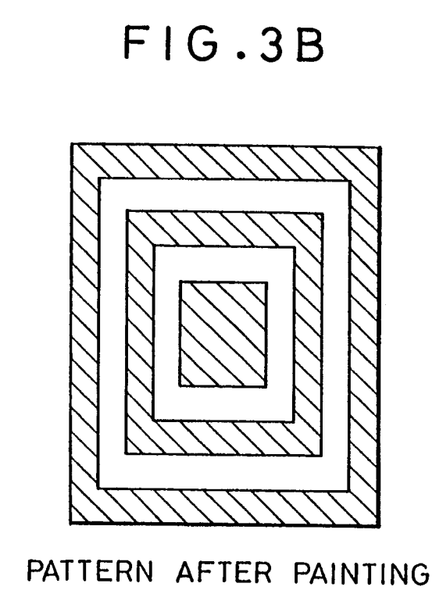

However, there is a problem in the even-odd method in the prior art. For example, when there is a pattern having a plurality of closed curves (or boundaries) along the scan line direction shown in FIG. 3A, painted areas (the shaded portions shown in FIG. 3B) are provided alternately. In such a case, it is difficult to paint any required areas at random.

Figure 4A:
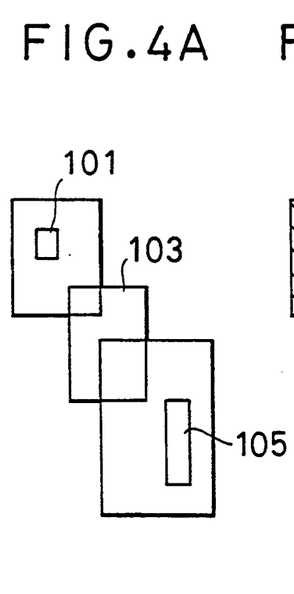
FIGS. 4A to 4C are pattern diagrams showing a painting operation to be executed by the conventional pattern generating system as shown in FIG. 1.
Figure 4B:
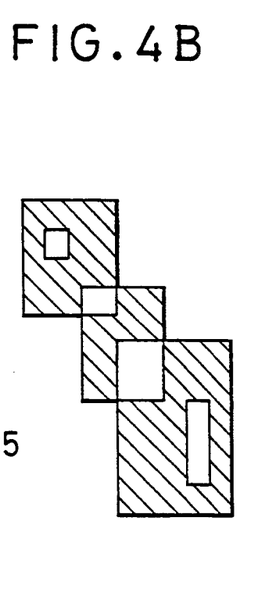
Figure 4C:
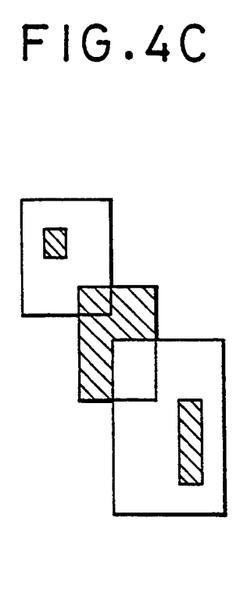

When a pattern having several required areas to be painted is obtained by using the system comprising the conventional pattern generation system (in which the first memory region A stores outline data and the second memory region B contains flag data) based on the even-odd rule, the resultant pattern data is required as shown in FIG. 4B. In addition, in the prior art, when the resultant pattern shown in FIG. 4C is required, by using the conventional pattern generation system, it is possible to generate the pattern with many processes. But the processes require much time and must be executed under the control of a host CPU. Each process can process only one segment which means a closed pattern.

The operation procedures above will now be explained with reference to FIGS. 5A to 5C.

Figure 5A:
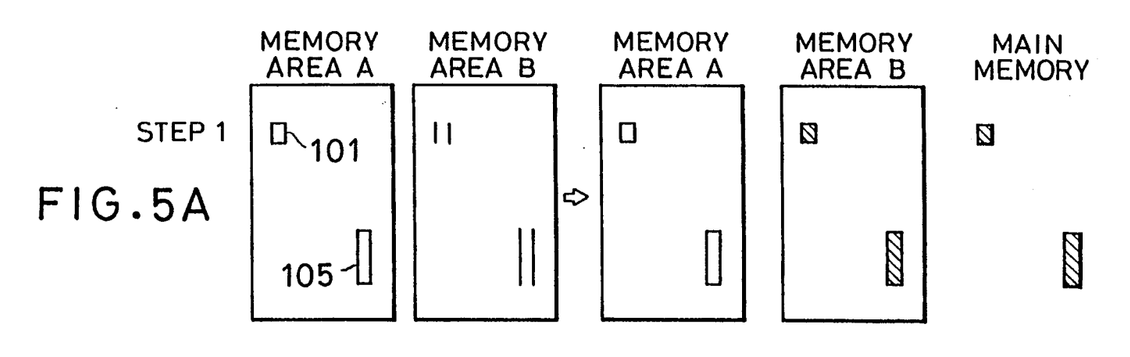
FIGS. 5A to 5C are diagrams for explaining a pattern painting step by the conventional pattern generating system as shown in FIG. 1.
Figure 5B:
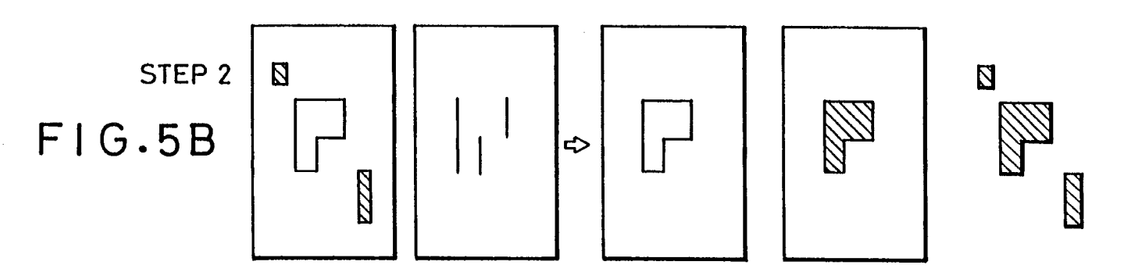

First, in step 1, shown in FIG. 5A, the pattern generating device 9 draws outline data and flag data for segments 101 and 105 shown in FIG. 4A in the first and the second memories A and B which have already been initialized completely under the control of the host CPU 1. Then, the outline data and the painted pattern data is stored in the first and the second memories A and B, respectively, after completion of these painting operations.

Then, the host CPU 1 reads out the painted pattern data in the second memory B to be transferred to the main memory 3. Next, in a step 2 as shown in FIG. 5B, the pattern generating device 9 initializes the contents of the first and the second memories A and B, then draws the outline data and the flag data of the segment 103 shown in FIG. 4A in the first and the second memories A and B as the painting operation.

Next, the painted pattern data in the second memory B is transferred to the main memory 3 in the host CPU 1, as in step 1. A logical OR operation between the painted data transferred from the main memory 3 and the painted data which have been transferred in step 1 shown in FIG. 5A is performed, and the resultant data is stored in the main memory 3.

Figure 5C:
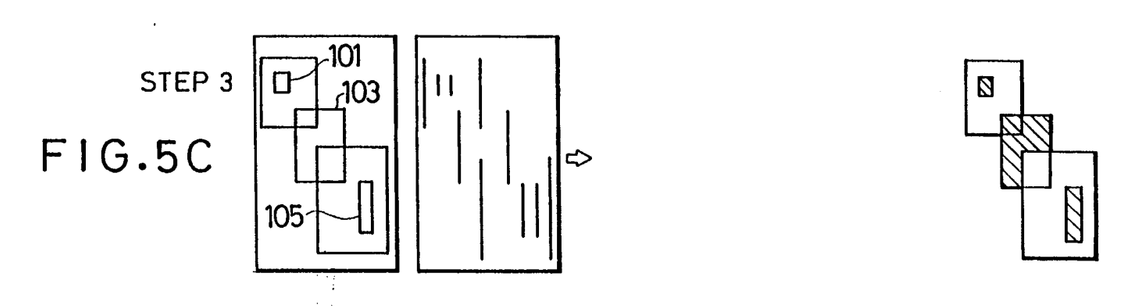

Next, in step 3, shown in FIG. 5C, the pattern generating device 9 initializes completely the contents of the first and the second memories A and B, then draws the outline from the outline data and the flag data of all of the segments as shown in FIG. 4A in the first and the second memories A and B. In step 3, the painting operation is not performed because there is no data to be painted. Accordingly, only the outline data in the first memory A is transferred to the main memory 3 in the host CPU 1. Then, the logical OR operation of the outline data and the data which has been stored in step 2 is executed, and the result of the operation is transferred to the main memory 3 under the control of the host CPU 1.

By the operations described above, the required data such as the data shown in FIG. 4C can be stored in the main memory 3. However, the painting operations described above require much time to obtain the required pattern data because these painting operations must access the host CPU 1 more frequently.

Accordingly, there is a problem in the prior art that the total time for the painting operations is long.

SUMMARY OF THE INVENTION

The present invention is provided to overcome the problem of the conventional painting operations and the conventional pattern generation system in the prior art.

An object of the present invention is therefore to provide a painting pattern generation system which can be made up of reduced hardware components, and which is capable of executing painting operations at a high speed.

As a preferred embodiment according to the present invention, a painting pattern generation system for painting interior areas enclosed by outlines by using outline data and flag data, comprises:

a first memory means used for storing data for drawing an outline by which patterns in the interior areas enclosed by the outline data are generated;

a second memory means used for storing drawing flag data by which the interior areas are painted;

an operational means for reading out the outline data and the flag data stored in the first and the second memory means, for performing an exclusive OR (XOR) operation between two adjacent items of flag data in the second memory means in a predetermined scan line direction, and for performing predetermined logical operations between the result of the XOR operation and the outline data in the first memory means in the scan line direction for all the scan lines to obtain the data for painting the patterns in the interior areas enclosed by the outline, and a writing means for writing the data for the pattern painted by the operation means into the first memory means and for further overlapping the data for the a next outline on the painted pattern data in the first memory means.

As another preferred embodiment according to the present invention, a pattern painting method for obtaining patterns painted in interior areas enclosed by an outline based on outline data comprises:

(a) a step for drawing a first outline from data stored in a first memory region, and for providing flag data to be used in painting the first outline;

(b) a step for reading out the data stored in the first and the second memory regions, then for performing an exclusive OR (XOR) operation between two adjacent items of flag data in a predetermined scan line direction in the second memory region, for performing a predetermined logical operation between the result of the XOR operation and the outline data in the first memory region in the scan line direction for all the scan lines to obtain pattern data for the interior area enclosed by the outlines;

(c) a step for clearing the content of the second memory region in parallel with the logical operation executed in step (b);

(d) a step for writing the pattern data obtained in step (b) into the first memory region;

(e) a step for writing data for the next outline into the first memory region to overlap with the pattern data obtained in (d), and for writing the flag data for the next outline into the second memory region which has already been cleared in step (c);

(f) a step for reading out the data stored in the first and the second memory regions, for performing an exclusive OR operation between two adjacent items of flag data for the next outline in the scan line direction, for performing a logical operation between the result of the XOR operation and the painted pattern data in the first memory region for all the scan lines in the outline to paint the pattern in the interior area enclosed by the next outline;

(g) a step for writing the data for the painted pattern obtained in the step (f) into the first memory region; and (h) a step for performing the steps (e) to (g) at predetermined times to obtain data for patterns in which the required interior area are painted.

As described above, the number of times the host CPU is accessed can be reduced by the system and the method based on the even-odd rule according to the present invention because a memory in the host CPU (which must be used frequently to generate the required painted patterns in the prior art) is not used to generate the required painted patterns.

These and other objects, feature and advantages of the present invention will be more apparent from the following description of a preferred embodiment, taken in conjunction with the accompanying drawings.

DETAILED DESCRIPTION OF THE EMBODIMENTS

Figure 6:
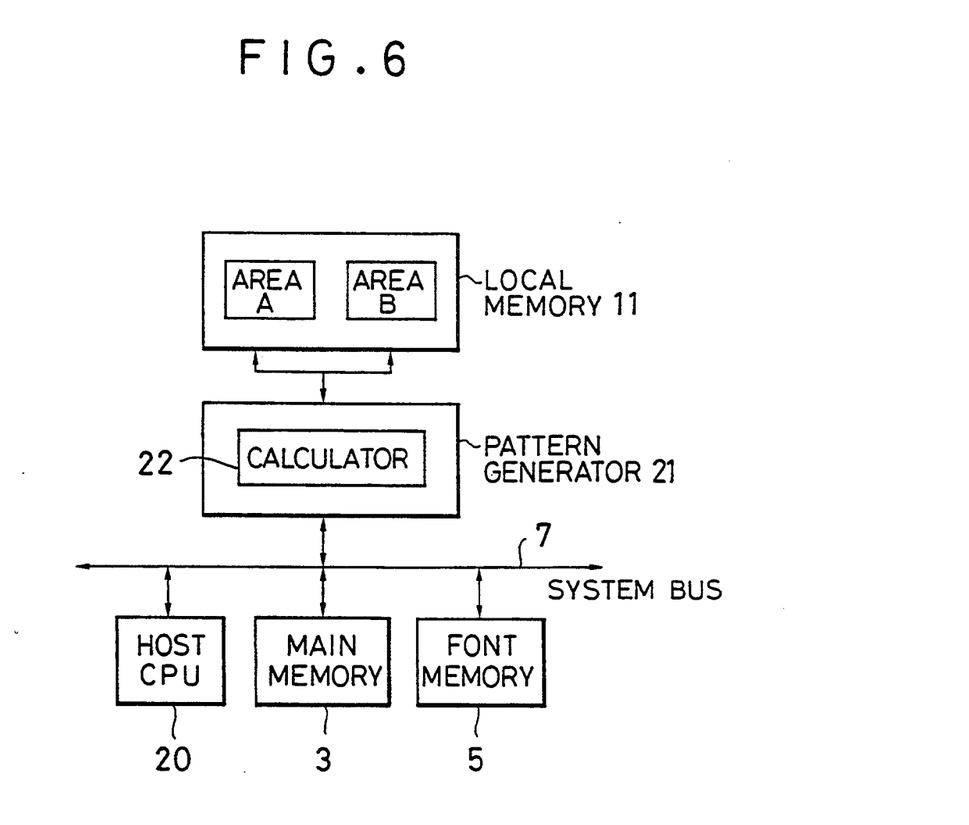
FIG. 6 is a diagram of a pattern generation system according to the present invention.

FIG. 6 is a block diagram of a painting pattern generating device which is capable of efficiently executing a painting operation for various patterns.

Although the configuration of the painting pattern generating device is similar to that of the conventional painting pattern generating device as shown in FIG. 1, the functions of a host CPU 20 and a pattern generation system are different from those of the conventional painting pattern generation system.

The difference will now be explained below in detail. In the painting pattern generation system according to the present invention, almost all the painting operations can be executed without the control of the host CPU 20 by only using the pattern generating device 21 and a local memory 11 at a high operation speed.

Hereinafter, the painting operation for painting patterns will be explained with reference to FIG. 7.

The patterns as shown in FIG. 4C are used as patterns to be painted in the following description.

Figure 7A:
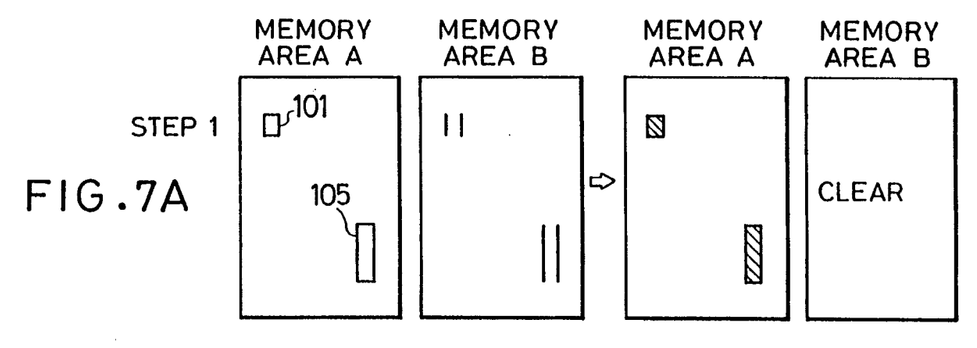
FIGS. 7A to 7C are diagrams for explaining a pattern painting operation by the pattern generation system according to the present invention.

First, in step 1, shown in FIG. 7A, the pattern generator 21 receives the clear command transferred from the CPU 20 for initializing the contents of the memories, then clears the contents of the first and the second memory regions A and B.

The pattern generator 21, which has received the clear command from the host CPU 20, draws outlines for the segments 101 and 105 shown in FIG. 7A in the first and the second memory regions. For the painting operation, the pattern generator 21 reads out the painting data stored in the first and the second memory regions, then performs an exclusive OR (XOR) operation between two adjacent items of flag data in the scan line direction (for painting the interior portion enclosed by the outline), and further performs a logical OR operation between the result of the XOR operation and the outline data from the first memory region A (for a compensation of data for painting the patterns in the interior areas). The flag data in the second memory region is cleared after the operation for the scan line in the painting operation described above.

The painting operation described above are operated along the scan lines for all closed curves (outlines), so that the painted pattern data of the segments 101 and 105 are obtained in the first memory region A shown in FIG. 7A.

Figure 8:
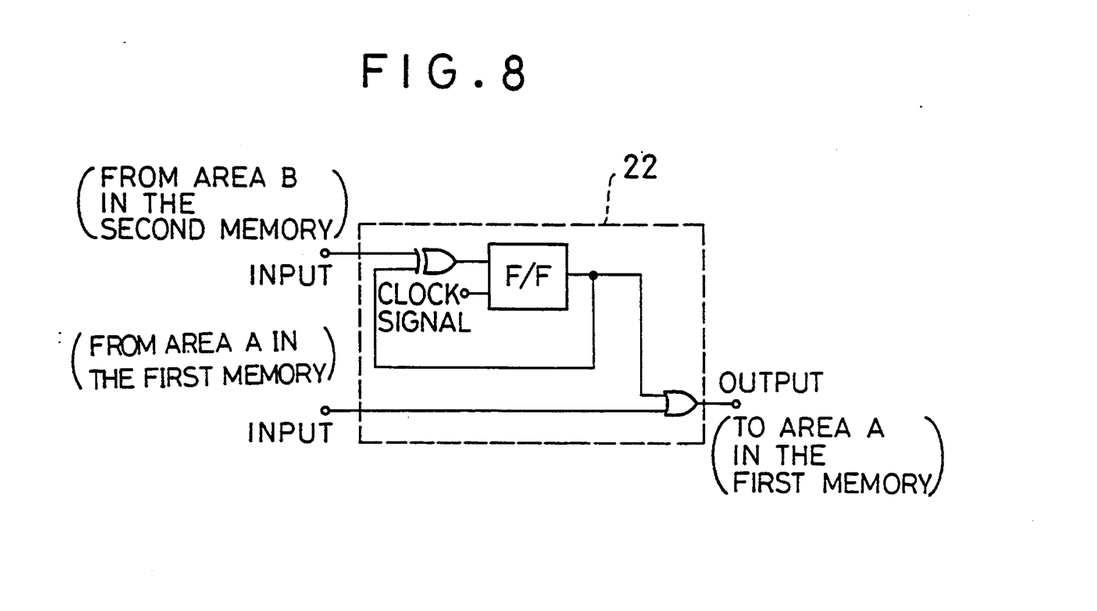
FIG. 8 is a diagram of a painting calculating device incorporated in the pattern generation system according to the present invention.

FIG. 8 is a block diagram of a calculator 22 for performing the XOR and OR operations which is widely used in the prior art for executing the painting operation described above. The combination of the exclusive OR gate and the flip/flop (F/F) of calculator 22 perform a first logical exclusive OR operation on adjacent elements of the first flag data stored in the second memory along a predetermined scan line diretion when the first flag data is input from the second memory into the exclusive OR gate, as shown in FIG. 8. The OR gate of calculator 22 performs a first logical OR operation on the output of the flip-flop and the first outline data stored in the first memory.

Figure 7B:
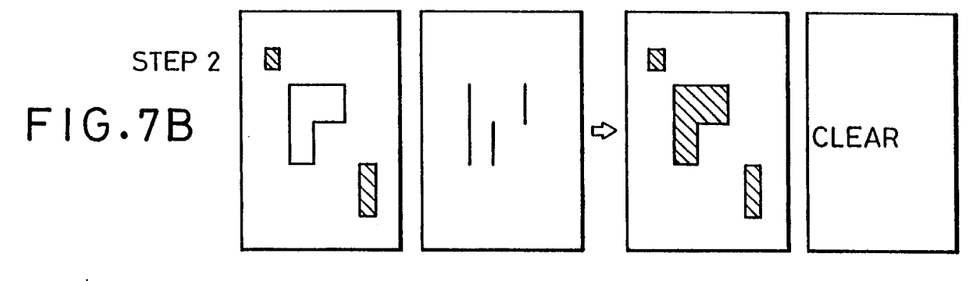

Next, in step 2, shown in FIG. 7B, the pattern generator 21, which has received the drawing command transferred from the host CPU 20, overlaps the outline data for the segment 103, shown in FIG. 4A, on the pattern data obtained in the step 1 described above, then further draws the flag data for the segment 103 in the second memory region B from the flags.

Next, the pattern generator 21 which has received the command for painting from the host CPU also performs the painting operation described in step 1, then writes the result of the operation on the scan line in the memory region A and clears the flag data in the memory region B when the operation on the scan line is completed.

The painting operations are executed for all of the scan lines on the closed curves to obtain the data for painting the patterns in the segments 101,103, and 105.

Figure 7C:
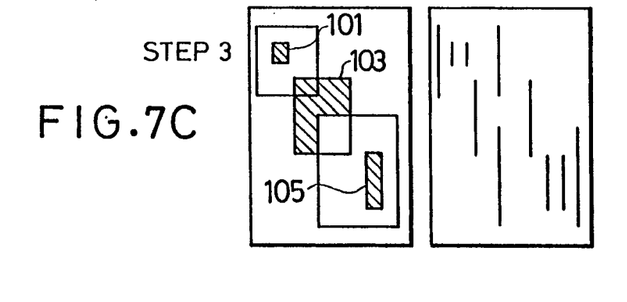

Next, in step 3, shown in FIG. 7C, the pattern generator 21, which has received the outline drawing command from the host CPU 20, draws the outline data of all of the segments on the patterns painted in the segments 101, 103, and 105 in the first memory region A.

As the result, the data for the pattern painted as shown in FIG. 4C can be obtained from the first memory region A.

The host CPU 20 transfers the pattern data contained in the first memory region A by a block transfer command.

By use of the pattern painting method and the system therefore in the embodiment according to the present invention, under the control of a host CPU, the painting operation for a plurality of areas enclosed by closed curves (or outlines) can be executed with a reduction in the number of access items of a main memory.

As described above in detail, any element in a pattern can be divided and overlaps with another pattern by using two memory regions for painting.

Without increasing the number of accesses to a host CPU and adding a relatively small amount of hardware, a high-speed painting operation can be obtained by using an even-odd rule for any area in the pattern.

Various modification will become possible for those skilled in the art after the teaching of the present disclosure without departing from the scope thereof.

What is claimed is:

1. A painting pattern generation system for painting interior areas enclosed by a plurality of closed curves using outline data representing the plurality of closed curves and using flag data representing information for a painting operation of the interior areas enclosed by the plurality of closed curves, the system comprising:

first memory means for storing the outline data and for outputting painted patterns for the interior areas;

second memory means for storing the flag data used for the painting operation of the interior areas enclosed by the plurality of closed curves;

operational means, coupled to the first and second memory means, for reading out first outline data stored in the first memory means and first flag data stored in the second memory means;

means for performing a first logical exclusive OR operation on adjacent elements of the first flag data stored in the second memory means along a predetermined scan line direction and for obtaining a first result of the first logical exclusive OR operation;

means for performing a first logical OR operation on the first result of the first logical exclusive OR operation and the first outline data stored in the first memory means, the logical OR operation being performed along the predetermined scan line used in the means for performing the first logical exclusive OR operation to obtain first painted pattern data for painting a first interior area of a first closed curve represented by the first outline data; and writing means for writing the first painted pattern data into the first memory means and for overlapping second outline data stored in the first memory means with the first painted pattern data stored in the first memory means wherein, the first logical exclusive OR operation and the first logical OR operation are executed for each of a plurality of scan lines which cross the first closed curve.

2. The painting pattern generation system according to claim 1, wherein the system further comprises clearing means, coupled to the second memory means, for clearing the first flag data stored in the second memory means in parallel with the logical OR operation performed by the means for performing a first logical OR operation.

3. The painting pattern generation system according to claim 2, wherein the writing means includes means for writing second flag data into the second memory means after the first flag data stored in the second memory means has been cleared by the clearing means, and wherein the operational means reads out the second outline data, stored in the first memory means, and the second flag data, stored in the second memory means, and the means for performing the first logical exclusive OR operation performs a second logical exclusive OR operation on adjacent elements of the second flag data along the predetermined scan line direction and obtains a second result of the second logical exclusive OR operation, and further the means for performing the first logical OR operation performs a second logical OR operation between the second result of the second logical exclusive OR operation and the first painted pattern data and the second outline data, stored in the first memory means, along the predetermined scan line direction and along each of a plurality of scan lines which cross a second closed curve represented by the second outline data, to obtain second painted pattern data, wherein the second logical exclusive OR operation and the second logical OR operation are executed for each of the plurality of scan lines which cross the second closed curve.

4. A pattern painting method for making patterns painted in interior areas enclosed by a plurality of closed curves using a plurality of outline data representing the plurality of closed curves and a plurality of flag data representing information for a painting operation of the interior areas enclosed by the plurality of closed curves, the method comprising the steps of:

writing first outline data into a first memory means and first flag data, used for painting an interior area of a first closed curve represented by the first outline data, into a second memory means;

reading out the first outline data stored in the first memory means and the first flag data stored in the second memory means;

performing a first logical exclusive OR operation on adjacent elements of the first flag data stored in the second memory means along a predetermined scan line direction and obtaining a result of the first logical exclusive OR operation;

performing a first logical OR operation on the result of the first logical exclusive OR operation and the first outline data stored in the first memory means along the predetermined scan line used in the steps for performing the first logical exclusive OR operation to obtain first painted pattern data;

clearing the first flag data, stored in the second memory means, in parallel with performing the first logical OR operation;

writing the first painted pattern data obtained by the first logical OR operation into the first memory means after the steps of the first logical exclusive OR operation and the first logical OR operation are executed for all scan lines crossing the first closed curve;

writing second outline data used for painting an interior area of a second closed curve, represented by the second outline data, into the first memory means to overlap with the first painted pattern data stored in the first memory means;

writing second flag data into the second memory means;

reading out the second outline data and the first painted pattern data, stored in the first memory means, and the second flag data in the second memory means;

performing a second logical exclusive OR operation on adjacent elements of the second flag data along the predetermined scan line direction and obtaining a second result of the second logical exclusive OR operation;

performing a second logical OR operation on the second result of the second logical exclusive OR operation and the first painted pattern data and the second outline data stored in the first memory means along the predetermined scan line used in the steps for performing the first logical exclusive OR operation and obtaining second painted pattern data; and writing the second painted pattern data into the first memory means after the steps of the second logical exclusive OR operation and the second logical OR operation are executed for all scan lines which cross the second closed curve.

5. The pattern painting method recited in claim 4, including the steps of repeatedly obtaining painted pattern data for each of the plurality of outline data.

6. The pattern painting method recited in claim 4 further including the step of clearing the second flag data stored in the second memory means in parallel with performing the second logical OR operation.

7. A pattern painting method for making patterns painted in interior areas enclosed by a plurality of closed curves using a plurality of outline data representing the plurality of closed curves and a plurality of flag data representing information for a painting operation of the interior areas enclosed by the plurality of closed curves, the method comprising the steps of:

writing outline data into a first memory means and writing flag data, used for painting an interior area of a closed curve represented by the outline data, into a second memory means;

reading out the outline data stored in the first memory means and the flag data stored in the second memory means;

performing a logical exclusive OR operation on adjacent elements of the flag data stored in the second memory means along a predetermined scan line direction to obtain a result of the logical exclusive OR operation;

performing a logical OR operation on the result of the logical exclusive OR operation and the outline data stored in the first memory means along the predetermined scan line direction used in the step of the logical exclusive OR operation to obtain painted pattern data;

clearing the flag data stored in the second memory means in parallel with performing the logical OR operation; and writing the painted pattern data obtained by the logical OR operation into the first memory means, wherein the steps for performing the logical exclusive OR operation and the logical OR operation are executed for all scan lines which cross the first closed curve.

* * * * *